Figure 1:
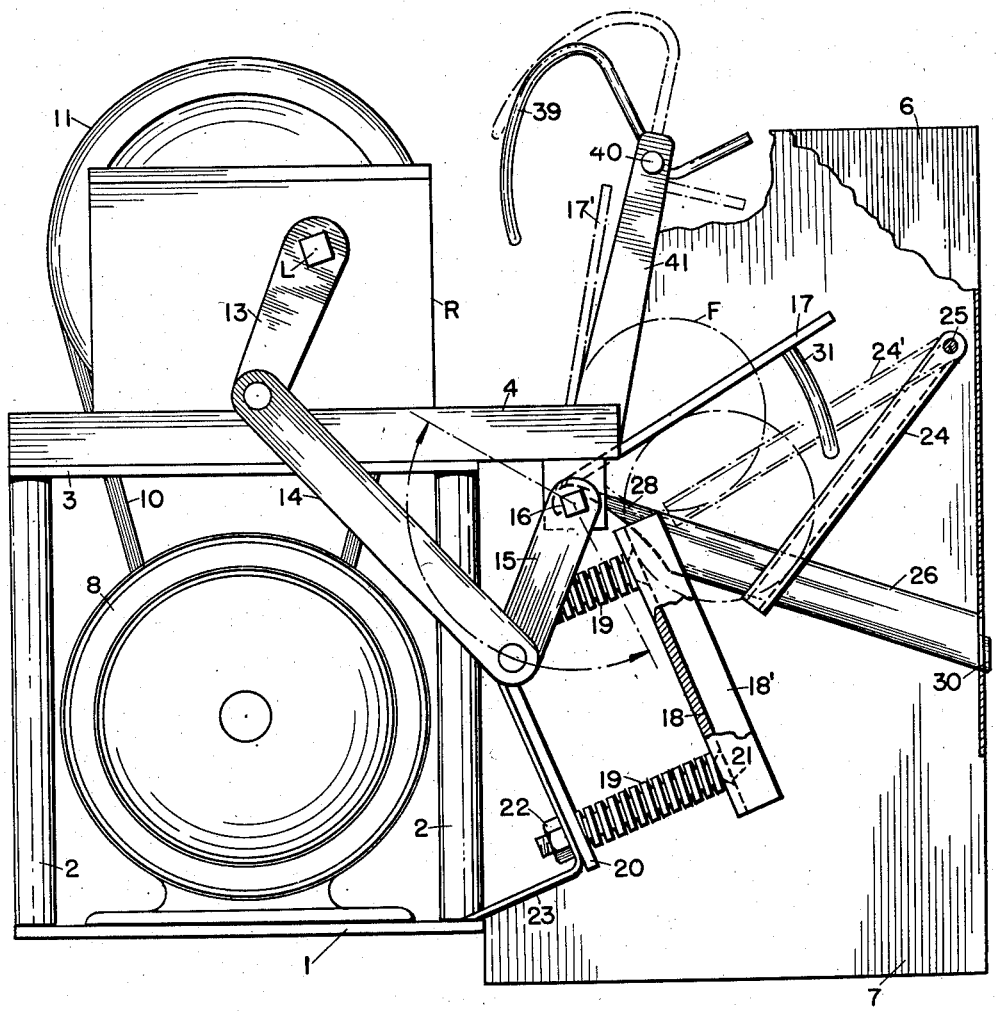

March 11, 1958 H. W. HAGERTY 2,826,137
FRUIT JUICE EXTRACTING MACHINE
Filed June 8, 1956 4 Sheets-Sheet 1

INVENTOR
HENRY W. HAGERTY
BY *Stewart Blackman*
ATTORNEY

March 11, 1958     H. W. HAGERTY     2,826,137

FRUIT JUICE EXTRACTING MACHINE

Filed June 8, 1956                              4 Sheets-Sheet 2

INVENTOR
HENRY W. HAGERTY

BY *Stewart Blackman*

ATTORNEY

March 11, 1958  H. W. HAGERTY  2,826,137
FRUIT JUICE EXTRACTING MACHINE
Filed June 8, 1956  4 Sheets-Sheet 3

INVENTOR
HENRY W. HAGERTY
BY
ATTORNEY

March 11, 1958 H. W. HAGERTY 2,826,137
FRUIT JUICE EXTRACTING MACHINE
Filed June 8, 1956 4 Sheets-Sheet 4

INVENTOR
HENRY W. HAGERTY
BY
ATTORNEY

United States Patent Office 2,826,137
Patented Mar. 11, 1958

2,826,137

FRUIT JUICE EXTRACTING MACHINE

Henry W. Hagerty, Coral Gables, Fla.

Application June 8, 1956, Serial No. 590,139

7 Claims. (Cl. 100—98)

This invention relates to an improvement in fruit juice extracting machines of the type more especially employed in the extraction of the juice from citrus fruits such as oranges, lemons and like species.

The invention has for its object to provide an apparatus of the character and for the purpose described which will be simple in construction, efficient in operation, and capable of ready and economical manufacture.

Other advantages of the invention will be discernible from the detailed description thereof hereinafter set forth.

Figure 2:
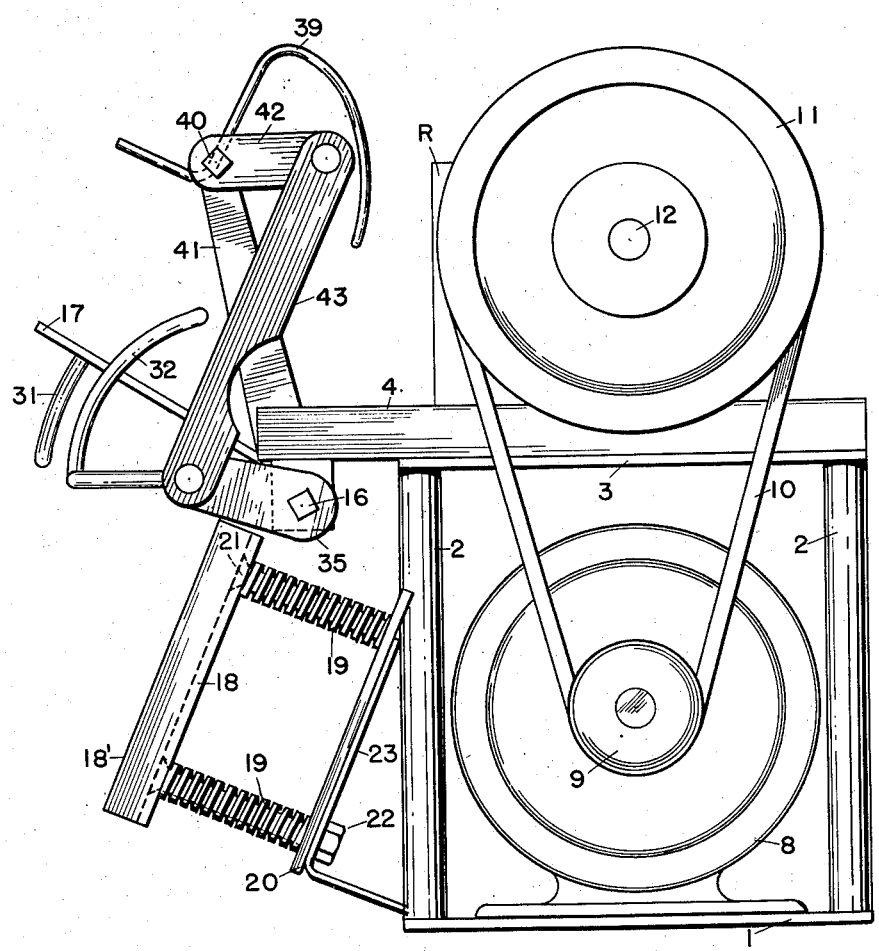
Figure 3:
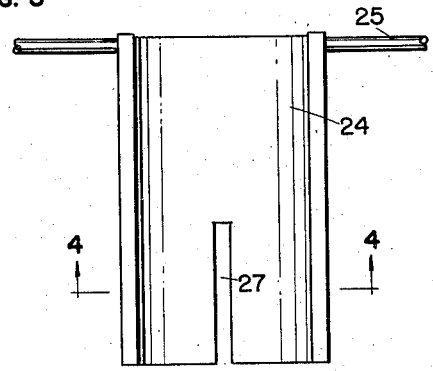
Figure 4:
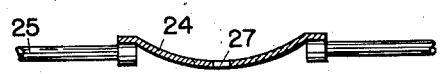
Figure 5:
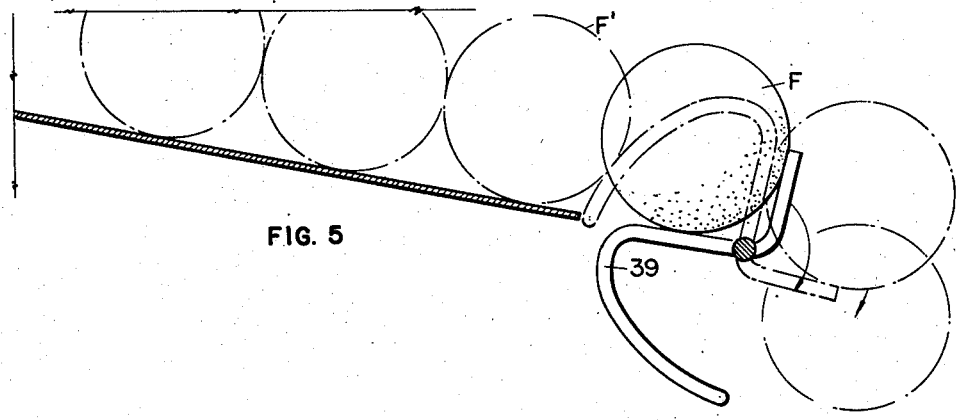
Figure 6:
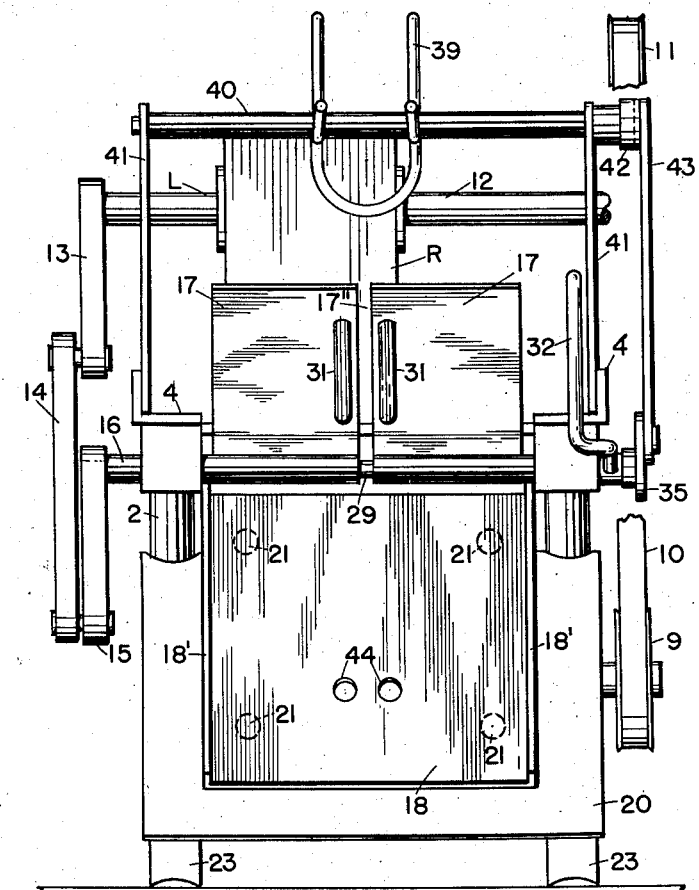
Figures 7, 8:
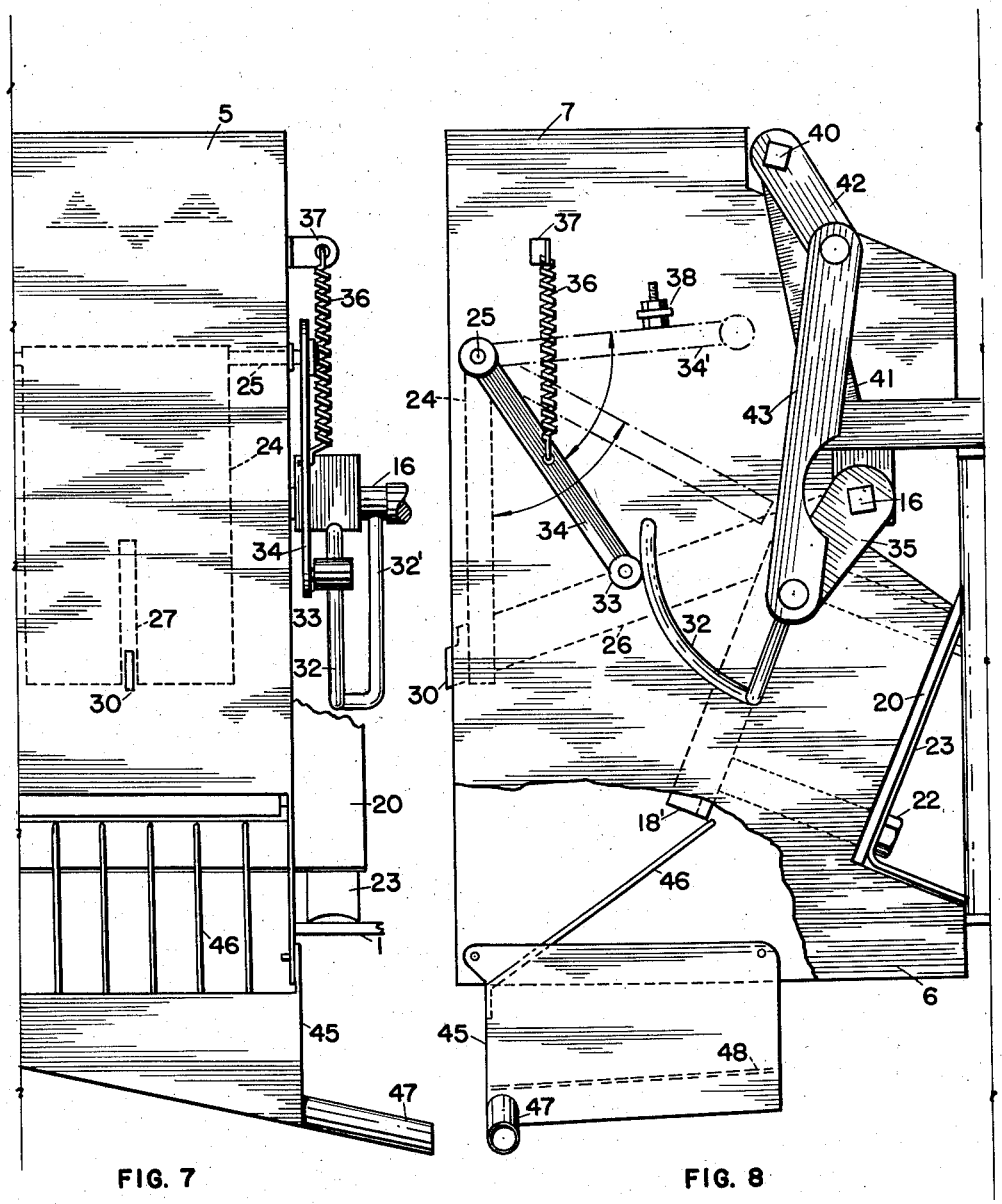

The invention is exemplified in a fruit juice extracting machine illustrated in the accompanying drawings, wherein the views are as follows, like reference characters, designating identical parts throughout the several views:

Fig. 1, a right side elevation of the machine with parts omitted for clarity;

Fig. 2, a side elevation of the view in Fig. 1, taken from the opposite side;

Fig. 3, a plan of the centering spoon;

Fig. 4, a section on line 4—4, Fig. 3;

Fig. 5, a sectional elevation of the fruit loading gate;

Fig. 6, a front elevation of the view shown in Fig. 2;

Fig. 7, a fractional front elevation of the machine with shield in place; and

Fig. 8, a left side elevation of the view in Fig. 7.

Referring to the drawings, the machine has a frame comprising a base 1 which carries four cylindrical corner posts 2 on which may be arranged a horizontal upper plate 3. This plate carries along the side marginal edges thereof, a pair of longitudinally disposed angle members 4, projecting forwardly of the plate 3. It will be understood that the frame may take any suitable structural assembly other than that here disclosed which may be adequate for the support of the apparatus of the extracting machine.

The frame includes the usual shield to screen the extracting expedients, arranged on the front of the machine, and consisting of a front wall 5, a right side wall 6, and a left side wall 7. This shield may be detachably secured to the frame in any suitable manner known in the art (not shown), by threadable fastenings secured to adjacent members of the framing structure, as will be readily understood by those skilled in the art.

Arranged in the lower portion of the frame, is a motor 8, the drive pulley 9 of which is connected by a belt 10 to a driven pulley 11 fixed on a shaft 12. This shaft is the high speed element of a speed reducer of conventional construction shown at R, Fig. 1, and the low speed shaft L (Fig. 6), issuing from the speed reducer, functions in the apparatus as the power shaft of the machine.

The power shaft L (Fig. 1), has fixed thereon a crank 13, connected by a link 14 with a crank 15, fixed on one end of a main shaft 16. By pre-determined relation of the radii of the cranks 13 and 15, the latter being of greater radius than the former, crank 13 is rotatable through a 360 degree revolution while the driven crank 15 is oscillatable only through substantially the arc of rotation defined by the arrow in Fig. 1. Thus, the main shaft 16 will be limited to oscillatory movement through a corresponding arc of rotation, as will be understood.

Fixed upon the main shaft 16 and projecting therefrom, is a press head plate 17 which has oscillatory movement with the main shaft whereby, when pivoted in a descending path, the head plate 17 will engage a back plate 18 for the purpose of pressing a fruit F therebetween. The head plate 17 is oscillatable, as illustrated in Fig. 1, between its retracted position at 17', to substantially the position occupied by the back plate 18, this plate being carried by four helical springs 19. These springs extend from the rear face of the back plate to a base plate 20 disposed in a plane parallel to the back plate 18, each spring having an axial bolt therethrough which is headed at 21 in the back plate. These bolts project in a threaded end thereof through the base plate 20 and are fitted with a nut or like fastening as at 22, the nut bearing against the rear face of the base plate.

Thus, the back plate 18 has a resilient support which is readily adjustable, by turning the nuts at 22. The base plate may be supported in any suitable manner from the adjacent frame members, as by brackets 23, secured by fastenings (not shown) known in the art.

Referring now to Figs. 1, 3, and 4, the machine is fitted with a centering spoon 24, fixed along its outer end on a shaft 25 which may be pintled in the side walls 6 and 7 (Fig. 7). This spoon extends inwardly to straddle, at its inward end, the working edge of a cutter 26, there being a central longitudinal slot 27 formed in the spoon for the accommodation of the cutter. The cutter terminates at its inner end in a hook member 28 adapted to engage the center of the main shaft 16, the diameter of which is reduced as at 29 (Fig. 6), to receive the hook member. The cutter inclines downwardly and forwardly, terminating in an endwise flange 30 which is received in a slot formed in the front wall 5 to receive this flange. Thus, when a fruit F (Fig. 1), is delivered by gravity to the spoon in its normal position of inclination 24', the fruit is directed by the spoon toward the convergence of the head plate in its retracted position 17' with the top edge of the cutter 26. The head plate has a claw member 31 projecting from the working face thereof to confine the fruit during passage of the head plate over the cutter, there being a central longitudinal slot 17'' formed in this plate to accommodate the cutter. It will be seen that the spoon 24 is depressible by the fruit moving downwardly until the spoon reaches the substantially upright position shown in Fig. 8, in which position the spoon is clear of the rotational path of the head plate 17. The spoon is held in this depressed position by the action of a cam member 32 engageable with a roller 33 which is carried by an arm 34 fixed to the spoon shaft 25 and arranged exteriorly of the shield (Fig. 7), for oscillation with the spoon. The cam 32 is carried by a crank 35 fixed on the main shaft 16 and oscillable therewith. In timed relation with the movements of the head plate 17, the cam 32 remains engaged with the roller 33 to depress the spoon, leading the roller in its ascending sweep until the arm 34 reaches its upper limit of rotation at 34', the arm being biased by a helical spring 36 fastened at the bottom end thereof to the arm 34 and at its upper end to a bracket 37 attached to the wall 7 of the shield structure, the arm being thus urged against a stop member 38. The cam 32 may, if desired, include a bracket portion 32' secured in the main shaft 16 as illustrated in Fig. 7.

The usual oscillatory gate 39 may be carried centrally of a secondary shaft 40, journaled at each end in a pair of brackets 41 extending upwardly from the framing structure. This shaft has fixed thereon a crank 42 (Fig.

2), connected by a link 43 to the crank 35, whereby to impart oscillatory movement to the gate.

In operation, a supply of the fruit is fed to the gate along the usual downwardly inclined chute, the bottom of which is shown symbolically in section in Fig. 5. The oscillatory movement of the gate 39 is timed in operative relation to the main shaft 16 so that the gate discharges the leading fruit F by gravity to the spoon 24 (Fig. 1), and at the same time will form a barrier restraining the succeeding fruit F' (Fig. 5). In this stage of the cycle of operation, the head plate is in substantially its position at 17' (Fig. 1), and the fruit will be positioned as at F. The head plate moves downwardly, the fruit being confined between the claw member 31, the cutter, and the spoon 24, the assembly which is pivotable, moving to sever the fruit against the working edge of the cutter. The halves of the fruit, as will be readily understood by those skilled in the art, are crushed between the head plate and the back plate 18, which is provided with apertures 44 (Fig. 6), in which the claw member 31 is receivable as the head plate descends in operative relation to the back plate. The juice thus extracted from the fruit flows down the back plate which is fitted with a pair of side flanges 18' to form a flume. The shield terminates at the bottom thereof in a detachable juice receptacle of known design, as at 45, there being a downwardly and outwardly inclined grating 46 fastened against the forward lip of the receptacle to receive and discharge the hulls and rinds of the exhausted fruit. The receptacle has the usual spout 47, to which the bottom of the receptacle is sloped, and is fitted with a strainer shown generally at 48 (Fig. 8) to entrap the seeds and the like accompanying the rinds.

The invention will be seen to provide a fruit juice extracting machine of improved and compact assembly. By virtue of the arrangement of two sets of linkage, one on each side of the frame, a power shaft imparts oscillatory movement to a main shaft, and the main shaft imparts oscillatory movement to a loading gate and, simultaneously, to a cam means for restraining the centering spoon to clear the arcuate path of the press head plate.

The back plate provides a resilient abutment against the extracting function of the head plate whereby to minimize objectionable oil and the like from over-pressing the rinds thereagainst and the resiliency of the back plate as well as its relative position in the assembly is adjustable.

Of course, the invention is susceptible to various modifications in design and arrangement without departing from the scope thereof as hereinafter claimed.

Having thus described the invention and the mode of its practice, what I claim as new and desire to secure by Letters Patent is:

I claim:

1. In a fruit juice extracting machine, a press back plate, a press head plate oscillatable through a forwardly directed descending arcuate path from a normally retracted position to a position of engagement with the back plate to press a fruit therebetween, an oscillatory main shaft supporting said head plate, a cutter extending in a vertical plane in the path of the head plate at an angle normal to the axis of rotation thereof, the edge of said cutter forming an angle with the plane of the working face of said head plate when said plate assumes said normally retracted position, said head plate having a central longitudinal slot for the accommodation of said cutter to permit passage thereover, a fruit centering spoon interposed in the descending path of the head plate and oscillatable through a rearwardly directed arcuate path, said spoon having a central longitudinal slot to straddle said cutter to permit passage thereover, spring means biasing said spoon from a depressed position to a position inclining rearwardly and downwardly to receive and gravitationally direct a fruit toward said angle formed between the cutter edge and working face of the head plate when in retracted position, a cam contact arm oscillatable with said spoon, cam means oscillatable by said main shaft and engageable with said arm to restrain the spoon in said depressed position against said biasing means in timed relation with the oscillatory movement of said head plate to clear the arcuate path thereof, and means to oscillate said main shaft.

2. The invention as defined in claim 1, and: claw means carried by said head plate and projecting from the working face thereof whereby to confine a fruit between said head plate and said spoon.

3. In a fruit juice extracting machine, a press back plate, a press head plate oscillatable on an axis through a forwardly directed descending arcuate path from a retracted position to a position for engagement with the back plate to press a fruit therebetween, an oscillatory main shaft supporting said head plate, a cutter extending in a vertical plane in the path of the head plate at an angle normal to the axis of oscillation thereof, the working edge of said cutter inclining downwardly and forwardly and forming a vertical angle with the working face of said head plate when in said retracted position, said head plate being slotted centrally and longitudinally thereof to straddle the cutter in descending passage thereover, a fruit centering spoon interposed in the descending path of said head plate and oscillatable through a rearwardly directed arcuate path, said spoon being slotted longitudinally thereof to accommodate the cutter in passage thereover, spring means biasing said spoon in rearward and downward inclination to receive and direct a fruit toward said vertical angle, cam means oscillatable from said main shaft and mechanically associated with said spoon for the restraint thereof in depressed position against said biasing means, and operable in timed relation with the oscillatory movement of said head plate to clear the arcuate path thereof, a claw member carried by said head plate, and projecting from the working face thereof to confine a fruit between said head plate and said spoon, and means actuating said main shaft.

4. The invention as defined in claim 3, and: a supporting frame for said back plate consisting of a base plate spaced rearwardly therefrom, a plurality of helical springs disposed longitudinally between the base and back plates, each of said springs having a bolt headed in said back plate, each bolt passing through said springs and terminating in a threaded portion passed loosely through said base plate, and a threadable fastening attachable to each of said threaded portions against the rear face of said base plate, whereby to adjust the tension of said springs and the operative position of said back plate.

5. A fruit juice extracting machine comprising a frame, a motor arranged therein and a power shaft driveable therefrom, a main shaft journaled in said frame, linkage means connecting said power shaft to said main shaft to impart oscillatory movement thereto, a press back plate arranged in said frame and a press head plate fixed to said main shaft and oscillatable therewith for engagement with said back plate to press a fruit therebetween, a cutter interposed in the path of said head plate at an angle normal to the axis of oscillation thereof, said head plate being slotted longitudinally thereof to straddle said cutter in passage thereover, a fruit-centering spoon pivoted in said frame forwardly of said back plate and extending rearwardly and downwardly to direct a fruit toward the working face of said head plate and the working edge of said cutter, said spoon being slotted longitudinally thereof to straddle said cutter in arcuate passage thereover, a cam contact arm oscillatable with said spoon and cam means oscillatable by said main shaft and engageable with said arm to restrain said spoon in a depressed position in timed relation with said head plate to clear the arcuate path thereof, and claw means carried by said head plate and projecting from the working face thereof to confine a fruit between said head plate and said spoon.

6. The invention as defined in claim 5, and: said cutter having a working edge inclining forwardly and downwardly, and spring means biasing said spoon in normally rearwardly and downwardly inclined position.

7. The invention as defined in claim 5, and: a secondary shaft journaled in said frame substantially above said main shaft, linkage means connecting said main and secondary shafts to impart oscillatory movement to the secondary shaft, a gate carried by the secondary shaft and oscillatable therewith in timed relation with the main shaft to deliver a fruit by gravity to said spoon when the head plate is in its retracted position at the beginning of its fruit pressing cycle.

References Cited in the file of this patent

UNITED STATES PATENTS

| | | |
|---|---|---|
| 620,047 | Neal | Feb. 21, 1899 |
| 1,938,463 | Roberts | Dec. 5, 1933 |
| 2,454,256 | Meyers | Nov. 16, 1948 |
| 2,522,800 | Quiroz | Sept. 19, 1950 |